United States Patent
Karim et al.

(10) Patent No.: US 8,973,356 B2
(45) Date of Patent: Mar. 10, 2015

(54) MODULAR EXHAUST MANIFOLD WITH INDEPENDENT SEALING OF EXHAUST TUBE AND COOLANT PASSAGE

(71) Applicant: Caterpillar, Inc., Peoria, IL (US)

(72) Inventors: MD Anwarul Karim, Peoria, IL (US); Robert A. Sarsfield, Dunlap, IL (US); Daniel Richard Barb, Germantown Hills, IL (US); Scott Alan Chockley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 13/664,516

(22) Filed: Oct. 31, 2012

(65) Prior Publication Data

US 2014/0116036 A1    May 1, 2014

(51) Int. Cl.
| | |
|---|---|
| F01N 3/02 | (2006.01) |
| F01N 5/02 | (2006.01) |
| F01N 1/00 | (2006.01) |
| F01N 3/04 | (2006.01) |
| F01N 13/10 | (2010.01) |

(52) U.S. Cl.
CPC .............. F01N 3/046 (2013.01); F01N 13/102 (2013.01); *Y02T 10/20* (2013.01)
USPC .................................. 60/321; 60/320; 60/323

(58) Field of Classification Search
USPC ........... 60/320, 321, 323; 29/890.052, 890.08
See application file for complete search history.

(56) References Cited

U.S. PATENT DOCUMENTS

| | | | |
|---|---|---|---|
| 3,206,836 A * | 9/1965 | Schlussler .................. | 29/890.08 |
| 3,798,904 A * | 3/1974 | Gleason et al. ................. | 60/310 |
| 4,205,527 A | 6/1980 | Rudert et al. | |
| 4,693,079 A | 9/1987 | Wuensche et al. | |
| 4,711,088 A | 12/1987 | Berchem et al. | |
| 4,866,934 A * | 9/1989 | Lindstedt ......................... | 60/321 |
| 5,011,194 A * | 4/1991 | Nitta .............................. | 285/41 |
| 5,148,675 A * | 9/1992 | Inman ............................. | 60/321 |
| 5,305,603 A | 4/1994 | Baumann | |
| 2008/0141666 A1* | 6/2008 | Mashiko et al. ................ | 60/321 |

FOREIGN PATENT DOCUMENTS

| | | |
|---|---|---|
| EP | 1431527 | 6/2004 |
| EP | 1862651 | 12/2007 |
| FR | 2679602 | 7/1991 |

OTHER PUBLICATIONS

Exhaust Manifold with Shielded Cooling, U.S. Appl. No. 13/172360, filed Jun. 29, 2011.

* cited by examiner

*Primary Examiner* — Audrey K Bradley
(74) *Attorney, Agent, or Firm* — BakerHostetler

(57) ABSTRACT

An internal combustion engine includes a cylinder block defining at least one cylinder, and a cylinder head coupled to the cylinder block. A modular exhaust manifold is coupled to the cylinder head and is configured to receive exhaust gas from the cylinder head. The modular exhaust manifold includes a plurality of exhaust manifold segments coupled together along a common axis. Each of the exhaust manifold segments includes a segment of a water jacket tube defining a plurality of liquid coolant passages and a segment of an exhaust tube received within the water jacket tube segment. A joint between adjacent exhaust manifold segments includes a first sealing member configured to seal the exhaust tube at the joint and a second sealing member configured to seal at least one of the liquid coolant passages at the joint. The first and second sealing members are supported on and movable with different components.

17 Claims, 2 Drawing Sheets

MODULAR EXHAUST MANIFOLD WITH INDEPENDENT SEALING OF EXHAUST TUBE AND COOLANT PASSAGE

TECHNICAL FIELD

The present disclosure relates generally to an exhaust manifold having a water jacket, and more particularly to a modular exhaust manifold with independent sealing of an exhaust tube and a coolant passage at joints of the modular exhaust manifold.

BACKGROUND

An exhaust manifold of an internal combustion engine is a collection of conduits through which exhaust gases produced during combustion are carried away from the engine. The exhaust manifold typically receives exhaust gases from each of the engine cylinders through exhaust valve ports in the cylinder head or cylinder block of the engine. The exhaust manifold then routes the exhaust gases through one or more aftertreatment components and/or one or more turbines of a turbocharger before expelling the exhaust gases into the atmosphere. During operation of the engine, the exhaust manifold becomes very hot due to the extremely high temperatures of the exhaust gases passing through the manifold. To reduce skin temperature and improve heat rejection, some exhaust manifolds include a water jacket near an exterior surface of the manifold.

An exemplary exhaust gas line for an internal combustion engine having a cooling liquid space is taught in U.S. Pat. No. 4,693,079 to Wuensche et al. (hereinafter Wuensche). In particular, the Wuensche reference teaches an exhaust gas line assembled of several housings, with each housing containing a cooling liquid space. The cooling liquid spaces of adjacent housings are connected with each other using a connecting nipple. It appears the connecting nipples, along with interconnections between exhaust tube segments, form the connections between the multiple housings. Although there exists a variety of different manifold designs in the art, it should be appreciated that there remains a continuing need for manifold designs offering improvements, including, for example, increased surface cooling, ease of manufacture or use, and improved sealing.

The present disclosure is directed to one or more of the problems or issues set forth above.

SUMMARY OF THE DISCLOSURE

In one aspect, an internal combustion engine includes a cylinder block defining at least one cylinder, and a cylinder head coupled to the cylinder block. A modular exhaust manifold is coupled to the cylinder head and is configured to receive exhaust gas from the cylinder head. The modular exhaust manifold includes a plurality of exhaust manifold segments coupled together along a common axis. Each of the exhaust manifold segments includes a segment of a water jacket tube defining a plurality of liquid coolant passages and a segment of an exhaust tube received within the water jacket tube segment. A joint between adjacent exhaust manifold segments includes a first sealing member configured to seal the exhaust tube at the joint and a second sealing member configured to seal at least one of the liquid coolant passages at the joint. The first and second sealing members are supported on and movable with different components.

In another aspect, a modular exhaust manifold for an internal combustion engine includes a first exhaust manifold segment including a first segment of a water jacket tube defining a first plurality of liquid coolant passages and a first segment of an exhaust tube received within the first water jacket tube segment. At least one end of the first water jacket tube segment includes a first radial flange defining a first engagement face configured for coupling the first exhaust manifold segment with a second exhaust manifold segment. The first water jacket tube segment further defines a first radial bypass channel fluidly connecting at least one of the first plurality of liquid coolant passages with a first bypass opening through the first engagement face. A distance between the first bypass opening and the first exhaust tube segment is greater than a distance between the at least one of the first plurality of liquid coolant passages and the first exhaust tube segment.

DETAILED DESCRIPTION

Figure 1:
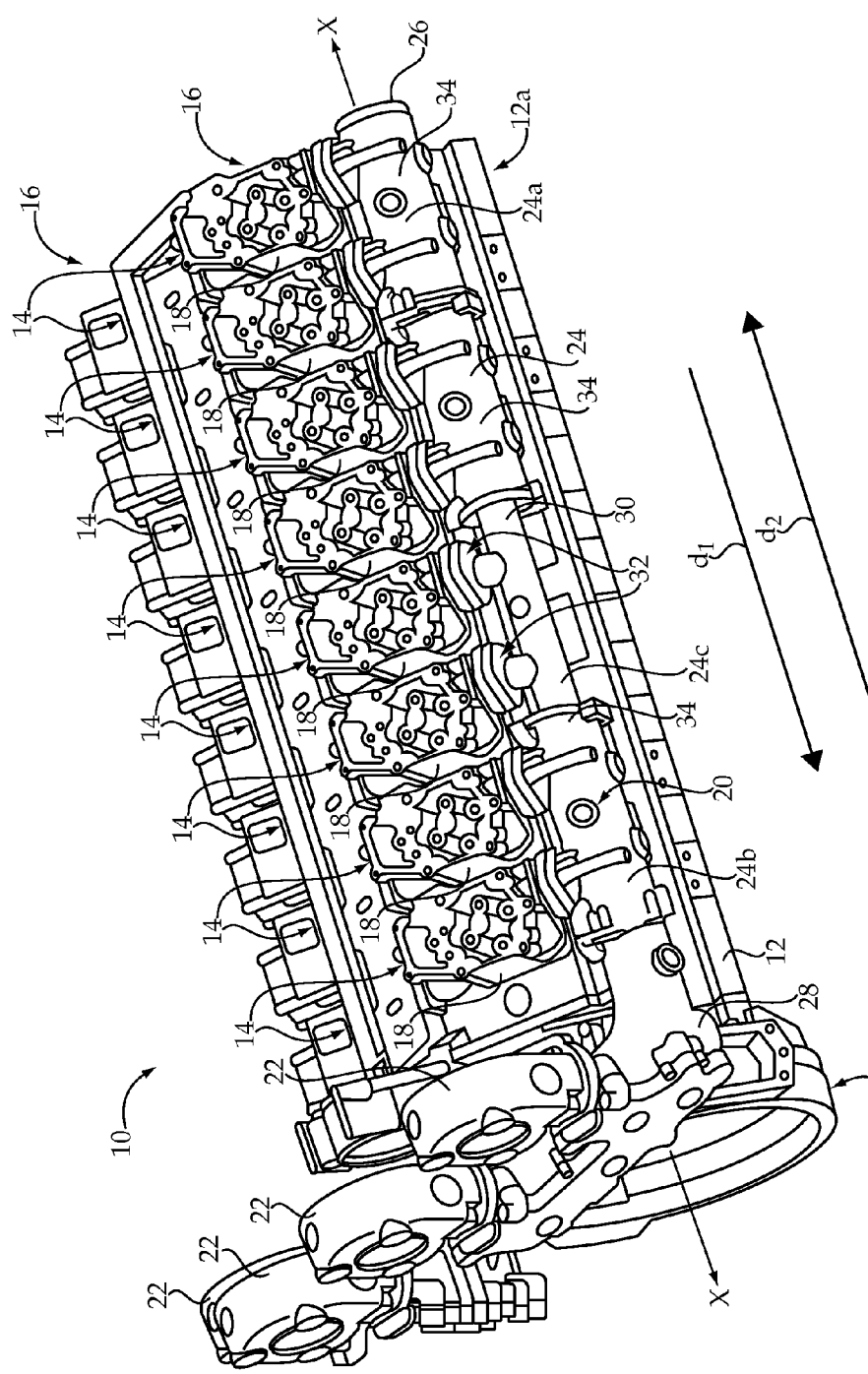
FIG. 1 is a schematic perspective view of an exemplary embodiment of an internal combustion engine including a modular exhaust manifold, according to the present disclosure.

Referring to FIG. 1, there is shown a schematic view of an internal combustion engine 10, which, for purposes of illustration, and not limitation, may be that of a four-stroke, compression ignition engine. The engine 10 generally includes a cylinder block 12, which extends along a longitudinal axis X between opposing ends 12a and 12b and defines a plurality of combustion chambers or cylinders 14. According to the present disclosure, the engine 10 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). According to the exemplary configuration, the cylinder block 12 defines two rows of eight longitudinally spaced cylinders 14, resulting in a V-16 configuration. However, those skilled in the art will appreciate that any configuration and number of cylinders 14 may be applicable.

The exemplary engine 10 also includes a cylinder head 16 for providing intake and exhaust flow communication with the cylinders 14 of each row. According to the exemplary embodiment, each cylinder head 16 may include a number of cylinder head modules 18 corresponding to the number of cylinders 14 defined by the cylinder block 12. However, it is contemplated that each cylinder head module 18 may serve to provide flow communication with more than one cylinder 14, such as, for example, two, three, or four cylinders 14. The cylinder head modules 18 may be configured to be decoupled individually from the cylinder block 12, thereby permitting removal of a single cylinder head module 18, without necessarily removing any other cylinder head modules 18. This exemplary configuration may serve to simplify maintenance of the engine 10, as should be appreciated by those skilled in the art.

According to the present disclosure, the exemplary engine 10 also includes a modular exhaust manifold 20 coupled to each cylinder head 16 to provide flow communication between exhaust ports of cylinder head 16 and the surroundings. The exemplary engine 10 includes four turbochargers 22 located generally at one longitudinal end of engine 10 (e.g., the opposite end 12b of the engine 10). According to the exemplary embodiment, two turbochargers 22 may be associated with each row of cylinders 14; however, other numbers of turbochargers 22 are contemplated, along with embodiments having no turbochargers. In the exemplary embodiment shown, the modular exhaust manifold 20 extends along the longitudinal axis X and provides flow communication between the cylinder heads 16 and the turbochargers 22.

As shown in FIG. 1, each exemplary modular exhaust manifold 20 includes a plurality of exhaust manifold segments 24 coupled to one another in end-to-end fashion along the common longitudinal axis X of the engine 10. According to some embodiments, the exhaust manifold segments 24 may have a substantially circular cross-section, although other cross-sections are contemplated. In the example shown, an exhaust manifold segment 24a located at an end of the modular exhaust manifold 20 opposite turbochargers 22 includes an end cap 26 (e.g., a removable end cap) preventing flow communication between modular exhaust manifold 20 and the surroundings via exhaust manifold segment 24a. At an end of the modular exhaust manifold 20 opposite the exhaust manifold segment 24a, an exhaust manifold segment 24b is coupled to a rise manifold section 28 extending between exhaust manifold segment 24b and turbochargers 22. According to the exemplary embodiment, the exhaust manifold segments 24 may be configured to direct exhaust gas in a first direction $d_1$ relative to the longitudinal axis X, while liquid coolant, such as water and/or a known coolant (e.g., a glycol-based coolant), is directed in a second direction $d_2$ relative to the longitudinal axis X that is opposite the first direction $d_1$.

As shown at exhaust manifold segment 24c (shown with portions removed), each exhaust manifold segment 24 includes an exhaust tube segment 30 configured to receive exhaust gas from an exhaust port 32 of the respective cylinder head module 18. Each exhaust manifold segment 24 also includes a water jacket tube segment 34 configured to receive a liquid coolant. As will become more apparent below, the exhaust tube segment 30 of each exhaust manifold segment 24 is telescopically received within the respective water jacket tube segment 34. Although not discussed in greater detail herein, each exhaust manifold segment 24 may include an adaptor tube coupled at one end to the water jacket tube segment 24 and at an opposite end to the respective cylinder head module 18. The adaptor tubes may be configured to provide flow communication between the cylinder head 16 and the exhaust tube segment 30 of each exhaust manifold segment 24. However, alternative arrangements for fluidly connecting the exhaust tube segments 30 with the cylinder head 16 are also contemplated.

Figure 2:
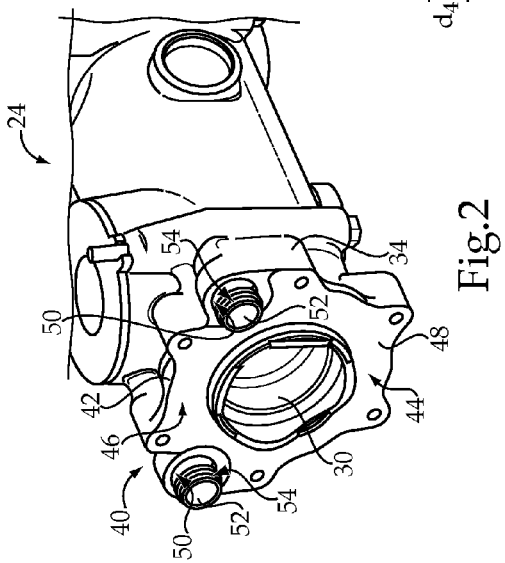
FIG. 2 is a schematic perspective view of a portion of an exhaust manifold segment of the exemplary modular exhaust manifold of FIG. 1, according to one aspect of the present disclosure.

Turning now to FIG. 2, an exemplary exhaust manifold segment 24, components of which may be made from aluminum or other suitable material, will be discussed in greater detail. In particular, and according to the present disclosure, at least one end 40 of each exhaust manifold segment 24 may include a radial flange 42 defining an engagement face 44, or surface, configured for coupling adjacent exhaust manifold segments 24 together using known attachment means. For example, removable fasteners, such as bolts, may be positioned through corresponding openings, such as threaded bores, of each engagement face 44 to secure a coupled position of adjacent exhaust manifold segments 24. However, alternative coupling means are also contemplated. As shown, a first sealing member 46 may be positioned along the engagement face 44 and may include a gasket 48, such as a multiple layers steel (MLS) gasket, positioned over the engagement face 44 and around the exhaust tube segment 30.

Figure 3:
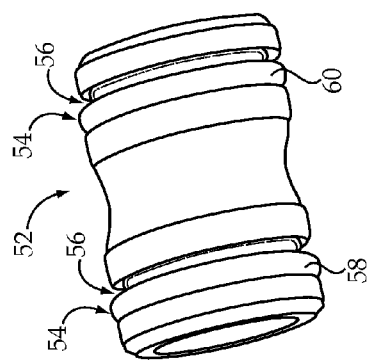
FIG. 3 is a schematic perspective view of an exemplary embodiment of a bypass tube of the exhaust manifold segment of FIG. 2, according to another aspect of the present disclosure.

At least one bypass opening 50 may be provided through the engagement face 44 for transferring liquid coolant from one exhaust manifold segment 24 to another. According to the exemplary embodiment, the liquid coolant passages defined by the water jacket tube segment 34 may converge toward one of exactly two bypass openings 50; however, the number of bypass openings 50 may vary depending on the particular application. As shown, the bypass openings 50 may be radially spaced from the exhaust tube segment 30 and may be free of contact with the gasket 48. A bypass tube 52, shown also in FIG. 3, may be positioned through each bypass opening 50 of each of the adjacent exhaust manifold segments 24 to fluidly connect the liquid coolant passages of adjacent exhaust manifold segments 24. A second sealing member 54 may be positioned about the bypass tube 52 and may include a radial seal positioned within an external groove 56 within the external surface of the bypass tube 52. As shown in FIG. 3, and as will be discussed in greater detail below, each bypass tube 52 may include a first o-ring seal 58 positioned about the bypass tube 52 at a first longitudinal position and a second o-ring seal 60 positioned about the bypass tube 52 at a second longitudinal position which is spaced from the first longitudinal position.

Figure 4:
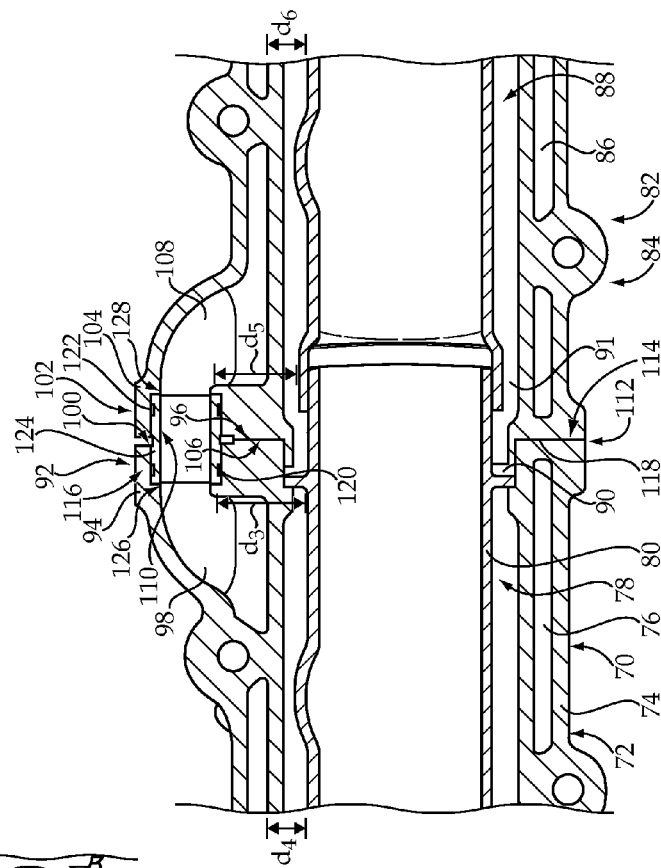
FIG. 4 is a schematic cross-sectional view of portions of a pair of adjacent exhaust manifold segments, according to another aspect of the present disclosure.

Turning now to FIG. 4, coupled exhaust manifold segments, which are similar to exhaust manifold segments 24 described above, will be discussed. In particular, a first exhaust manifold segment 70 includes a first segment 72 of a water jacket tube 74 defining a first plurality of liquid coolant passages 76 and a first segment 78 of an exhaust tube 80 received within the first water jacket tube segment 72. Similarly, a second exhaust manifold segment 82 includes a second segment 84 of the water jacket tube 74 defining a second plurality of liquid coolant passages 86 and a second segment 88 of the exhaust tube 80 received within the second water jacket tube segment 84. The first and second exhaust tube segments 78 and 88 each receive exhaust gases from a respective cylinder head module 18 and, when coupled together to define a modular exhaust manifold such as manifold 20 of FIG. 1, define the engine exhaust tube 80. Further, each of the sets of liquid coolant passages 76 and 86 are joined together when the water jacket tube segments 72 and 84 are coupled to ultimately define the water jacket tube 74.

As shown, a support member 90 may be positioned in a gap 91 between the exhaust tube segments 78 and 88 and the water jacket tube segments 72 and 84 of the adjacent exhaust manifold segments 70 and 82. Each support member 90 may be configured to maintain a desired shielding distance between the exhaust tube 80 and the water jacket tube 74. In particular, the gap 91 may provide an insulation shield between the outer surface of each exhaust tube segment 78 and 88 and the respective water jacket tube segment 72 and 84, and may contain a fluid, such as, for example, air and/or another gas. The support member 90 may define an annular ring, with the exhaust tube segment 78 and 88 being received in the annular ring. According to a specific example, the support member 90 may include a longitudinally extending portion and a radially extending flange spacing the exhaust tube segment 78 and 88 from the water jacket tube segment 72 and 84. According to some embodiments, the support member 90 may be secured to the exhaust tube segment 78 and 88 using fasteners, adhesives and/or welding.

An end 92 of the first water jacket tube segment 72 includes a first radial flange 94 defining a first engagement face 96 configured for coupling the first exhaust manifold segment 70 with the second exhaust manifold segment 82. The first water jacket tube segment 72 also defines a first radial bypass channel 98, extending radially as the channel 98 approaches the end 92, fluidly connecting at least one of the first plurality of liquid coolant passages 76 with a first bypass opening 100 through the first engagement face 96. As shown, a distance $d_3$ between the first bypass opening 100 and the first exhaust tube segment 78 is greater than a distance $d_4$ between the liquid coolant passages 76 and the first exhaust tube segment 78.

Similarly, an end 102 of the second water jacket tube segment 84 includes a second radial flange 104 defining a second engagement face 106 configured for coupling the second exhaust manifold segment 82 with the first exhaust manifold segment 70. The second water jacket tube segment 84 also defines a second radial bypass channel 108 fluidly connecting at least one of the second plurality of liquid coolant passages 86 with a second bypass opening 110 through the second engagement face 106. A distance $d_5$ between the second bypass opening 110 and the second exhaust tube segment 88 is greater than a distance $d_6$ between the liquid coolant passages 86 and the second exhaust tube segment 88.

A joint 112 between the first and second exhaust manifold segments 70 and 82 includes a first sealing member 114 configured to seal the exhaust tube 80 at the joint 112, and a second sealing member 116 configured to seal the liquid coolant passages 76 and 86 of the water jacket tube 74 at the joint 112. According to the present disclosure, the first and second sealing members 114 and 116 are supported on and movable with different components. For example, the first sealing member 114 may include a gasket 118 positioned between the first and second engagement faces 96 and 106 and attached in a known manner. The second sealing member 116 may include first and second o-ring seals 120 and 122 positioned about a bypass tube 124, as described above with reference to FIG. 3. The bypass tube 124 may be positioned through the first bypass opening 100 and the second bypass opening 110 to fluidly connect a portion of the first plurality of liquid coolant passages 76 and a portion of the second plurality of liquid coolant passages 86. The first o-ring seal 120 may be positioned about the bypass tube 124 and within the first radial bypass channel 98, and the second o-ring seal 122 may be positioned about the bypass tube 124 and within the second radial bypass channel 108.

Gaps 126 and 128 may be provided at either end of the bypass tube 124 between the bypass tube 124 and an end stop or shoulder within the respective radial bypass channel 98 and 108. Such gaps 126 and 128 may permit movement of the bypass tube 124 as the water jacket tube segments 72 and 84 shift or bow as a result of thermal expansion. Positioning the o-ring seals 120 and 124 within the radial bypass channels 98 and 108 allows for the sealing of the liquid coolant passages 76 and 86 of the water jacket tube 74 at the joint 112 even during any axial shifting of the bypass tube 124 that may occur. It should be appreciated that the exhaust tube segments 78 and 88 may also be joined at a slip joint to permit limited movement.

INDUSTRIAL APPLICABILITY

The present disclosure may be applicable to internal combustion engines having exhaust manifolds. Further, the present disclosure may be applicable to exhaust manifolds having water jackets for reducing the skin temperature of the exhaust manifold. Further, the present disclosure may be applicable to modular manifold designs offering improved manufacturability and serviceability. Yet further, the present disclosure may be applicable to strategies for sealing joints between exhaust manifold segments of a water jacket cooled modular exhaust manifold.

Referring generally to FIGS. 1-4, an exemplary internal combustion engine 10 generally includes a cylinder block 12 defining a plurality of cylinders 14. A cylinder head 16 is coupled to the cylinder block 12 and provides intake and exhaust flow communication with the cylinders 14. The exemplary engine 10 also includes a modular exhaust manifold 20, as disclosed herein, coupled to each cylinder head 16 to provide flow communication between exhaust ports of the cylinder head 16 and the surroundings. As shown in FIG. 1, each exemplary modular exhaust manifold 20 includes a plurality of exhaust manifold segments 24 coupled to one another in end-to-end fashion along a common longitudinal axis X of the engine 10.

The modularity of the exhaust manifold 20, as described herein, provides advantages at least from a manufacturability and/or serviceability standpoint. In particular, by utilizing a plurality of similar exhaust manifold segments 24, similar parts may be manufactured for engines of different sizes and/or configurations. For example, manufacturing the engine 10 shown in FIG. 1 requires the use of four exhaust manifold segments 24 for each cylinder head 16, with each exhaust manifold segment 24 corresponding to two cylinders 14. The resulting V-16 engine 10 thus requires the use of eight exhaust manifold segments 24. Manufacturing a V-12 engine, however, may only require the use of six of the exhaust manifold segments 24.

Serviceability may also be improved by the modularity of the manifold design. In particular, maintenance times and resulting costs may be reduced by minimizing the number of parts to be removed during the servicing or repair. In particular, accessing a cylinder 14 or cylinder head module 18 may require removal of only the corresponding exhaust manifold segment 24 without the need to remove the entire exhaust manifold 20. Thus, according to the modular exhaust manifold 20 disclosed herein, it may be possible to perform maintenance associated with one cylinder 14 more easily relative to an engine that includes a unitary manifold.

As described above, and with specific reference to FIG. 4, adjacent exhaust manifold segments 70 and 82 each include a water jacket tube segment 72 and 84 and an exhaust tube segment 78 and 88 received within the water jacket tube segment 72 and 84. A joint 112 between adjacent exhaust manifold segments 70 and 82 includes a first sealing member 114 configured to seal the exhaust tube 80 at the joint 112 and a second sealing member 116 configured to seal the liquid coolant passages 76 and 86 at the joint 112. For example, the first sealing member 114 may include a gasket 118 positioned between the engagement faces 96 and 106 of the adjoining ends 92 and 102 of the adjacent exhaust manifold segments 70 and 82. In particular, adjoining ends 92 and 102 of the adjacent exhaust manifold segments 70 and 82 each include a radial flange 94 and 104 defining the engagement faces 96 and 106, which are configured for coupling the adjacent exhaust manifold segments 70 and 82 together. When the exhaust manifold segments 70 and 82 are coupled, the first sealing member 114, supported on one or both of the engagement faces 96 and 106, effectively seals the exhaust tube 80 at the joint 112.

Coupling the adjacent exhaust manifold segments 70 and 82 also secures a relative position of one or more bypass tubes 124 within radial bypass channels 98 and 108 of the respective exhaust manifold segments 70 and 82. In particular, each bypass tube 124 is positioned through bypass openings 100 and 110 through the respective engagement faces 96 and 106. A first o-ring seal 120 is positioned about the bypass tube 124 and within the radial bypass channel 98 of the first exhaust manifold segment 70, and a second o-ring seal 122 is positioned about the bypass tube 124 and within the radial bypass channel 108 of the second exhaust manifold segment 82. The second sealing member 116, which may include the first and second o-ring seals 120 and 122, is supported on the bypass tube 124 and effectively seals the liquid coolant passages 76 and 86 of the water jacket tube 74 at the joint 112.

The modular exhaust manifold disclosed herein includes improved sealing at the joints between segments of the manifold. In particular, each joint includes independent sealing of the exhaust tube and the liquid coolant passages at the joint. Effectively sealing the exhaust tube using a face seal, such as an MLS gasket, reduces leakage of the exhaust gas within the exhaust manifold, while effectively and independently sealing the liquid coolant passages using the sealing strategy provided herein reduces the leakage of liquid coolant into the exhaust tube and ultimately into the engine cylinders. In particular, the sealing strategy disclosed herein includes coolant bypass openings spaced away from the exhaust tube and including bypass tubes fluidly connecting the liquid coolant passages. Radial o-ring seals are provided around the bypass tube and within the respective bypass channel to seal the liquid coolant passages independently from the exhaust gas sealing.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An internal combustion engine, comprising:
a cylinder block defining at least one cylinder;
a cylinder head coupled to the cylinder block;
a modular exhaust manifold coupled to the cylinder head and configured to receive exhaust gas from the cylinder head, the modular exhaust manifold including a plurality of exhaust manifold segments coupled together along a common axis, and each of the exhaust manifold segments includes a segment of a water jacket tube defining a plurality of liquid coolant passages and a segment of an exhaust tube received within the water jacket tube segment; and
the plurality of exhaust manifold segments including at least two adjacent exhaust manifold segments and a joint disposed between the at least two adjacent exhaust manifold segments, the joint having a first sealing member configured to seal at least one of the exhaust tube segments at the joint and a second sealing member configured to seal at least one of the liquid coolant passages at the joint, the first and second sealing members being supported on and movable with different components, and the second sealing member including at least one o-ring seal,
wherein adjoining ends of the adjacent exhaust manifold segments each include a radial flange defining an engagement face configured for coupling the adjacent exhaust manifold segments together, and
wherein the first sealing member includes a gasket positioned between the engagement face of each of the adjoining ends of the adjacent exhaust manifold segments.

2. The internal combustion engine of claim 1, further including a support member positioned in a gap between the exhaust tube segment and the water jacket tube segment of each of the adjacent exhaust manifold segments, wherein the support member is configured to maintain a desired shielding distance between the exhaust tube segment and the water jacket tube segment of each of the adjacent exhaust manifold segments.

3. The internal combustion engine of claim 1, wherein each of the exhaust tube segments is configured to direct exhaust gas in a first direction relative to the common axis and each of the liquid coolant passages are configured to direct liquid coolant in a second direction relative to the common axis that is opposite the first direction.

4. The internal combustion engine of claim 1, wherein each of the water jacket tube segments of each of the adjacent exhaust manifold segments further defines a radial bypass channel fluidly connecting the at least one liquid coolant passage with a bypass opening through the engagement face, wherein a distance between the bypass opening and the exhaust tube segment of at least one exhaust manifold segment is greater than a distance between the at least one liquid coolant passage and the exhaust tube segment of the at least one exhaust manifold segment.

5. The internal combustion engine of claim 4, wherein the liquid coolant passages of each of the adjacent exhaust manifold segments converge toward one of exactly two bypass openings.

6. The internal combustion engine of claim 4, further including a bypass tube positioned through the bypass opening of each of the adjacent exhaust manifold segments, wherein the bypass tube is configured to fluidly connect the at least one liquid coolant passage of each of the adjacent exhaust manifold segments.

7. The internal combustion engine of claim 6, wherein the at least one o-ring seal of the second sealing member is positioned about the bypass tube.

8. The internal combustion engine of claim 7, wherein the second sealing member includes a first o-ring seal positioned about the bypass tube and within the radial bypass channel of one of the adjacent exhaust manifold segments, and a second o-ring seal positioned about the bypass tube and within the radial bypass channel of another of the adjacent exhaust manifold segments.

9. A modular exhaust manifold for an internal combustion engine, comprising:
a first exhaust manifold segment including a first segment of a water jacket tube defining a first plurality of liquid coolant passages and a first segment of an exhaust tube received within the first water jacket tube segment, at least one end of the first water jacket tube segment including a first radial flange defining a first engagement face configured for coupling the first exhaust manifold segment with a second exhaust manifold segment, the first water jacket tube segment further defining a first radial bypass channel fluidly connecting at least one of the first plurality of liquid coolant passages with a first bypass opening through the first engagement face, wherein a distance between the first bypass opening and the first exhaust tube segment is greater than a distance between the at least one of the first plurality of liquid coolant passages and the first exhaust tube segment, a gap formed between an outer surface of the first exhaust tube segment and the first water jacket tube segment, a second exhaust manifold segment including a second segment of the water jacket tube defining a second plurality of liquid coolant passages and a second segment of the exhaust tube received within the second water jacket tube segment, at least one end of the second water jacket tube segment including a second radial flange defining a second engagement face configured for coupling the second exhaust manifold segment with the first exhaust manifold segment, and the second water jacket tube segment further defining a second radial bypass channel fluidly connecting at least one of the second plurality of liquid coolant passages with a second bypass opening through the second engagement face, wherein a distance between the second bypass opening and the second exhaust tube segment is greater than a distance between the at least one of the second plurality of liquid coolant passages and the second exhaust tube segment.

10. The modular exhaust manifold of claim 9, wherein the first plurality of liquid coolant passages converge toward one of exactly two bypass openings.

11. The modular exhaust manifold of claim 9, further including a support member positioned in the gap between the first exhaust tube segment and the first water jacket tube segment, wherein the support member is configured to maintain a desired shielding distance between the first exhaust tube segment and the first water jacket tube segment.

12. The modular exhaust manifold of claim 9, wherein a joint between the first and second exhaust manifold segments includes a first sealing member configured to seal the exhaust tube at the joint and a second sealing member configured to seal the at least one of the first plurality of liquid coolant passages and the at least one of the second plurality of liquid coolant passages at the joint.

13. The modular exhaust manifold of claim 12, wherein the first and second sealing members are supported on and movable with different components.

14. The modular exhaust manifold of claim 13, wherein the first sealing member includes a gasket positioned between the first engagement face and the second engagement face.

15. The modular exhaust manifold of claim 13, further including a bypass tube positioned through the first bypass opening and the second bypass opening to fluidly connect the at least one of the first plurality of liquid coolant passages and the at least one of the second plurality of liquid coolant passages.

16. The modular exhaust manifold of claim 15, wherein the second sealing member includes an o-ring seal positioned about the bypass tube.

17. The modular exhaust manifold of claim 16, wherein the second sealing member includes a first o-ring seal positioned about the bypass tube and within the first radial bypass channel, and a second o-ring seal positioned about the bypass tube and within the second radial bypass channel.

* * * * *